United States Patent
DiRezze et al.

(10) Patent No.: US 12,278,877 B2
(45) Date of Patent: Apr. 15, 2025

(54) COMMUNICATION SYSTEM AND METHOD

(71) Applicant: DEZZIRE LLC, Shelby Township, MI (US)

(72) Inventors: Michael A. DiRezze, Grosse Pointe Shores, MI (US); Arnaldo I. DiRezze, Shelby Township, MI (US)

(73) Assignee: DEZZIRE LLC

( * ) Notice: Subject to any disclaimer, the term of this patent is extended or adjusted under 35 U.S.C. 154(b) by 318 days.

(21) Appl. No.: 17/713,333

(22) Filed: Apr. 5, 2022

(65) Prior Publication Data

US 2023/0319161 A1 Oct. 5, 2023

(51) Int. Cl.
| | |
|---|---|
| *H04L 67/60* | (2022.01) |
| *H04W 4/12* | (2009.01) |
| *H04W 4/20* | (2018.01) |
| *H04W 4/30* | (2018.01) |
| *H04W 68/00* | (2009.01) |

(52) U.S. Cl.
CPC ............... *H04L 67/60* (2022.05); *H04W 4/12* (2013.01); *H04W 4/20* (2013.01); *H04W 4/30* (2018.02); *H04W 68/005* (2013.01)

(58) Field of Classification Search
CPC ........... H04W 4/12; H04W 4/20; H04W 4/30; H04W 68/005; H04L 67/60
See application file for complete search history.

(56) References Cited

U.S. PATENT DOCUMENTS

| | | | |
|---|---|---|---|
| 6,480,580 B1 | 11/2002 | Beswick et al. | |
| D486,806 S | 2/2004 | Takayama et al. | |
| D486,807 S | 2/2004 | Takayama et al. | |
| 6,892,083 B2 | 5/2005 | Shostak | |
| 6,901,255 B2 | 5/2005 | Shostak | |
| 7,190,802 B2 | 3/2007 | Rains et al. | |
| 7,206,594 B2 | 4/2007 | Shostak | |
| 7,248,881 B2 | 7/2007 | Shostak | |
| 7,257,415 B2 | 8/2007 | Shostak | |
| 7,310,541 B2 | 12/2007 | Shostak | |
| 7,457,751 B2 | 11/2008 | Shostak | |
| 7,764,972 B2 | 7/2010 | Shostak | |
| 7,953,447 B2 | 5/2011 | Shostak | |
| 7,974,924 B2 | 7/2011 | Holla et al. | |
| 7,978,619 B2 | 7/2011 | Nielsen | |
| 8,098,806 B2 | 1/2012 | Shostak | |
| 8,121,649 B2 | 2/2012 | Shostak | |
| 8,175,887 B2 | 5/2012 | Shostak | |

(Continued)

FOREIGN PATENT DOCUMENTS

| | | |
|---|---|---|
| EP | 1540925 B1 | 1/2016 |
| WO | 2006060443 A3 | 5/2007 |

OTHER PUBLICATIONS

Collins, Rhonda. Vocera. https://videos.vocera.com/.

*Primary Examiner* — Timothy X Pham
(74) *Attorney, Agent, or Firm* — Carlson, Gaskey & Olds, P.C.

(57) ABSTRACT

In some aspects, the techniques described herein relate to a system, including: a first mobile device; and a second mobile device, wherein the first mobile device is configured to send a task message to the second mobile device and, in response, the second mobile device is configured to repeatedly, and at predefined intervals, play the task message audibly until an input clearing the task message is received by the second mobile device.

13 Claims, 2 Drawing Sheets

(56) References Cited

U.S. PATENT DOCUMENTS

| | | | |
|---|---|---|---|
| 8,260,709 B2 | 9/2012 | Holla et al. | |
| 8,380,613 B2 | 2/2013 | Dala et al. | |
| 8,396,801 B1 | 3/2013 | Dala et al. | |
| 8,396,803 B1 | 3/2013 | Dala et al. | |
| 8,396,804 B1 | 3/2013 | Dala et al. | |
| D679,673 S | 4/2013 | Wheaton et al. | |
| 8,498,865 B1 | 7/2013 | Shostak | |
| 8,626,246 B2 | 1/2014 | Shostak | |
| 8,849,718 B2 | 9/2014 | Dala et al. | |
| 8,880,035 B1* | 11/2014 | Beck | H04L 51/224 455/418 |
| 8,977,548 B2 | 3/2015 | Shostak | |
| 9,215,583 B2 | 12/2015 | Shostak | |
| 9,817,809 B2 | 11/2017 | Shostak | |
| 10,257,277 B2 | 4/2019 | Schlapfer et al. | |
| D879,061 S | 3/2020 | Jiang et al. | |
| 10,623,498 B2 | 4/2020 | Schlapfer et al. | |
| 2004/0043797 A1 | 3/2004 | Shostak | |
| 2004/0230809 A1 | 11/2004 | Lowensohn et al. | |
| 2006/0004571 A1 | 1/2006 | Ju et al. | |
| 2013/0253936 A1* | 9/2013 | Harvey | G06F 3/16 704/270.1 |
| 2020/0335209 A1 | 10/2020 | Holscher et al. | |
| 2021/0366490 A1* | 11/2021 | Hsieh | G10L 17/06 |
| 2022/0139570 A1* | 5/2022 | Hettig | G06Q 10/10 705/2 |

* cited by examiner

COMMUNICATION SYSTEM AND METHOD

TECHNICAL FIELD

This disclosure relates to a communication system and method, which includes various features that are particularly suited to benefit intra-office communication.

BACKGROUND

Workplace communication is the process of exchanging information and ideas between one person or group and another person or group within an organization. It can include e-mails, videoconferencing, text messages, notes, calls, etc. Effective communication between coworkers helps get various jobs done, builds a sense of trust between coworkers, and increases productivity. In a medical office setting, such as a dental office setting, effective communication helps keep workers and their colleagues working efficiently such that patients receive quality dental care in a timely manner.

SUMMARY

In some aspects, the techniques described herein relate to a system, including: a first mobile device; and a second mobile device, wherein the first mobile device is configured to send a task message to the second mobile device and, in response, the second mobile device is configured to repeatedly, and at predefined intervals, play the task message audibly until an input clearing the task message is received by the second mobile device.

In some aspects, the techniques described herein relate to a system, wherein the task message is a message including a request for a user of the second mobile device to perform a task.

In some aspects, the techniques described herein relate to a system, wherein: the task is one of a plurality of predefined tasks; an interface of the first mobile device is configured to present the plurality of predefined tasks for selection by a user of the first mobile device, and in response to the user of the first mobile device selecting one of the plurality of predefined tasks, the first mobile device is configured to generate the task message.

In some aspects, the techniques described herein relate to a system, wherein the first mobile device is configured such that the user of the first mobile device is able to select the one of the plurality of predefined tasks using one or more audible commands.

In some aspects, the techniques described herein relate to a system, wherein the second mobile device is configured to receive an audible input clearing the task message.

In some aspects, the techniques described herein relate to a system, wherein: the system includes a group including the second mobile device and a plurality of additional mobile devices, and wherein, in response to the first mobile device sending the task message, each of the mobile devices in the group is configured to repeatedly, and at predefined intervals, play the task message audibly until an input confirming receipt of the task message is received by one of the mobile devices in the group.

In some aspects, the techniques described herein relate to a system, wherein: when one of the mobile devices in the group receives an input confirming receipt of the task message, the task message is repeatedly, and at predefined intervals, played audibly only on the mobile device that has received the input confirming receipt of the task message, until an input clearing the task message is received by the mobile device that has received the input confirming receipt of the task message.

In some aspects, the techniques described herein relate to a system, wherein: the system includes a group of mobile devices, the group of mobile devices includes the first and second mobile devices and a plurality of additional mobile devices, and the first and second mobile devices are configured to initiate and receive one-on-one calls with the other mobile devices in the group.

In some aspects, the techniques described herein relate to a system, wherein the first and second mobile devices are configured to initiate and receive group calls with the other mobile devices in the group.

In some aspects, the techniques described herein relate to a system, wherein the first and second mobile devices are both configured to send a broadcast to each of the other mobile devices in the group.

In some aspects, the techniques described herein relate to a system, wherein: the first mobile device is configured to send a general reminder message to the second mobile device, the second mobile device is configured to audibly play the general reminder message, and wherein the general reminder message includes information that is relevant to a user of the first mobile device but is not a task required to be performed by the user of the first mobile device.

In some aspects, the techniques described herein relate to a system, wherein the first mobile device is configured to send a task message to the second mobile device when the first mobile device is in a lock screen.

In some aspects, the techniques described herein relate to a system, wherein use of at least some native functionality of the first and second mobile devices is restricted by a mobile device management software.

In some aspects, the techniques described herein relate to a system, including: a mobile device, wherein the mobile device includes an interface configured to receive an audible request to set a timer for a predefined task, wherein the mobile device is configured to correlate the predefined task with a predefined period of time, and, in response to the audible request to set the timer for the predefined task, the mobile device is configured to set a timer for the predefined period of time corresponding to the respective predefined task.

In some aspects, the techniques described herein relate to a system, wherein the predefined task is a step in a medical procedure that includes monitoring a time interval.

In some aspects, the techniques described herein relate to a system, wherein the predefined task is a crown impression.

In some aspects, the techniques described herein relate to a system, wherein, when the timer expires, the mobile device is configured to audibly play a message.

In some aspects, the techniques described herein relate to a system, wherein the message indicating the timer has expired also indicates a location of origin corresponding to the timer.

In some aspects, the techniques described herein relate to a method, including: sending a task message from a first mobile device to a second mobile device, wherein the task message is a message including a request for a user of the second mobile device to perform a task; repeatedly, and at predefined intervals, playing the task message audibly on the second mobile device; and stopping the second mobile device from playing the task message when an input clearing the task message is received by the second mobile device.

In some aspects, the techniques described herein relate to a method, further including: sending the task message from the first mobile devices to a plurality of mobile devices in a group; repeatedly, and at predefined intervals, playing the task message audibly on each of the mobile devices of the group; and receiving a message from one of the mobile devices of the group confirming receipt of the task message; stopping all mobile devices from playing the task message except the mobile device that confirmed receipt of the task message; repeatedly, and at predefined intervals, playing the task message audibly only on the mobile device that confirmed receipt of the task message; and stopping the mobile device that confirmed receipt of the task message from playing the task message when an input clearing the task message is received by the mobile device that confirmed receipt of the task message.

DETAILED DESCRIPTION

This disclosure relates to a communication system and method, which includes various features that are particularly suited to benefit intra-office communication.

Figure 1:
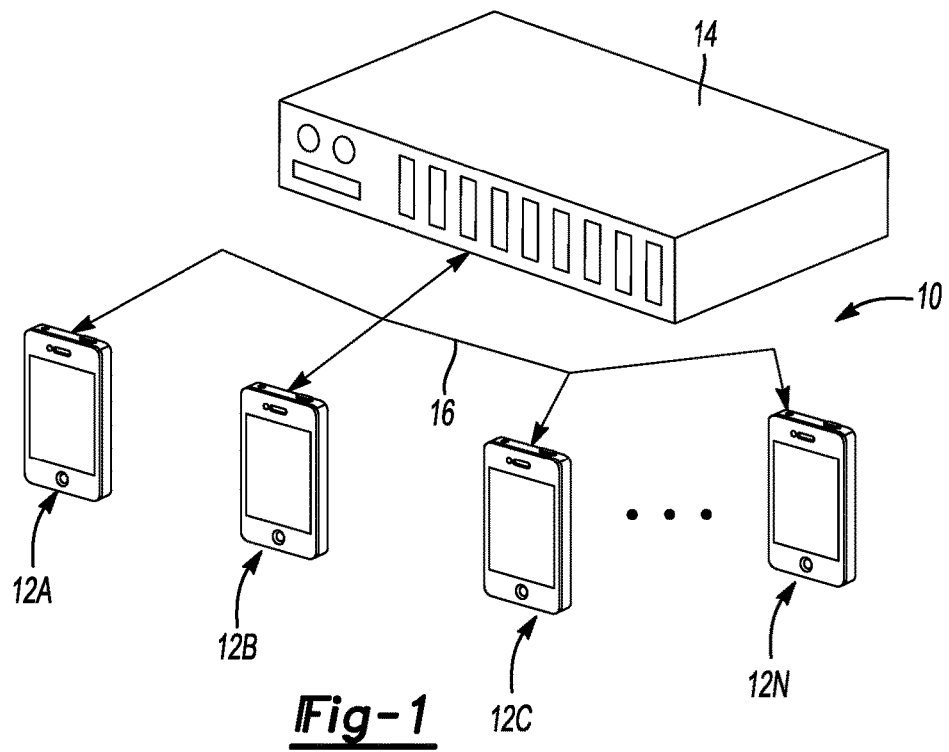
FIG. 1 is a highly schematic view of an example system according to this disclosure.

FIG. 1 is a highly schematic view of an example communication system 10 ("system 10"). The system 10 permits a plurality of mobile devices 12A-12N, where "N" and the ellipsis in FIG. 1 represent any number of mobile devices, to communicate with one another. The mobile devices 12A-12N in this example are mobile computing devices, such as tablets or smartphones. Each of the mobile devices 12A-12N includes a human-user interface that permits a user to receive information from the mobile devices 12A-12N and to input various information and commands.

In one particular example, the mobile devices 12A-12N are able to run a software application, which in the example is not native to the operating system of the mobile devices 12A-12N, and the mobile devices 12A-12N are configured such that the non-native software application is able to receive voice commands when in a lock screen, without a user being required to unlock the device. The full functionality of the non-native software application is available via the lock screen. Even when in the lock screen, the mobile devices 12A-12N are able to run in a full power mode such that the mobile devices 12A-12N do not go to sleep or time out when in the lock screen, in turn making the full functionality of the non-native software application useable. While the software application is non-native to the mobile devices 12A-12N in this example, the mobile devices 12A-12N could include the software application as a native application. In this example, the mobile devices 12A-12N may each be provided by a Samsung Galaxy A12 smartphone. In this disclosure, reference to the mobile devices 12A-12N performing some function is a reference to the mobile devices 12A-12N using their hardware, software, including the software application that is intended for use in intra-office communication as discussed above and below, and/or a central computing device 14 to perform the function.

In addition to the mobile devices 12A-12N, the system 10 includes one or more central computing devices 14. In this example, the central computing device 14 is provided by one or more servers. While illustrated as a single server, the central computing device 14 can be implemented using multiple components at various locations. The system 10 is illustrated for purposes of explanation, and should not be considered as limiting regarding the type or number of computing devices used for performing the techniques described herein. In particular, this disclosure extends to systems that include two or more mobile devices.

In this example, the mobile devices 12A-12N and the central computing device 14 are in communication with each other as schematically shown via a connection 16, which may be a wireless link and/or other connection, such as those used to access the Internet. Each of the mobile devices 12A-12N and the central computing device 14 includes memory, hardware, and software, and be configured to communicate with one another and transmit data between one another. The mobile devices 12A-12N and the central computing device 14 are further configured to store information and data, and to send and receive instructions relative to one another in order to execute the methodology and techniques described herein. The mobile devices 12A-12N include hardware and software configured to perform the various functions described herein in addition to the various functions of known tablets and smartphones. The central computing device 14 includes hardware and software configured to perform the various functions described herein in addition to the various functions of known servers.

Figure 2:
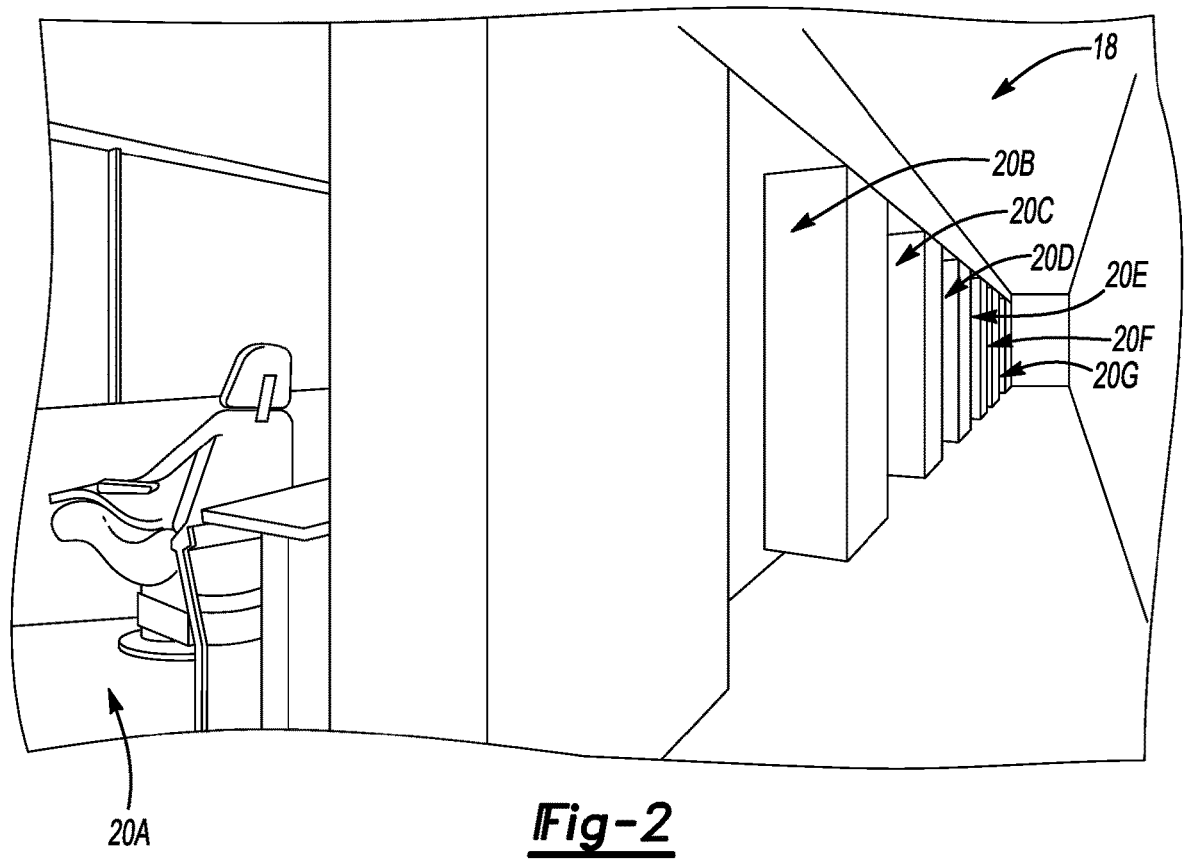
FIG. 2 is a view of an exemplary dental office.

In an office setting, communication between workers is paramount. Medical offices, such as dental offices, rely on frequent communication between workers, including doctors or dentists, and various supporting workers, such as nurses or dental hygienists or other staff. With respect to dental offices in particular, an example dental office 18 (FIG. 2) has a plurality of examination rooms ("exam rooms") in which dentists and/or hygienists use to perform various procedures on patients. The example dental office 18 of FIG. 2 has seven exam rooms 20A-20G. Often, there are fewer dentists in the dental office 18 than both the number of exam rooms and the number of patients that are being seen at any one time. As such, hygienists and other staff routinely need to call upon a dentist, and vice versa, at various times during certain procedures. Effective communication between the hygienists/staff and the dentists is required to ensure an efficient workplace and positive patient experiences/outcomes. The system 10 facilitates communication between hygienists/staff and dentists, and in turn increases effective communication in the dental office 18, leading to a more efficient workplace and more positive patient experiences/outcomes. While a dental office is mentioned as an example throughout this disclosure, the system 10 can be used in any workplace or office setting, including medical offices, dental offices, and other types of offices and industries.

In an example aspect of this disclosure, the dental office 18 will include the system 10. In a particular example, workers of the dental office 18 will be assigned one of the mobile devices 12A-12N. The workers will then log into a software application on their respective mobile device 12A-12N using an assigned username and a created password, for example. Workers may log in at the beginning of a working day after obtaining a mobile device 12A-12N from a storage location in the dental office 18, and the workers may log out at the end of the working day and then place the mobile devices 12A-12N back in the storage location. The storage location may be a common location and may include various chargers for the mobile devices 12A-12N. In this example, the mobile devices 12A-12N will not be assigned long term to a particular user, and any user can use any of the mobile devices 12A-12N for a given work day. Users of the software application create a profile, including a name, picture or avatar, and various settings, which is saved on the central computing device 14, such that when a user logs into the software application their profile is the same regardless of which mobile device 12A-12N is being used by the user at that particular time. Alternatively, some or all of the workers may be assigned a mobile device 12A-12N for a longer duration such that the workers are not required to frequently log in, log out, and/or store the mobile devices 12A-12N in a common storage location.

The software application running on the mobile devices 12A-12N is configured to cause the mobile devices 12A-12N and the system 10 generally to perform the functionality of this disclosure. Specifically, the software application enables communication within the dental office 18, otherwise referred to as intra-office communication. The software application may have profiles for each user and each dental office, such that users of the software application can communicate with users or groups of users within their dental office.

Figure 3:
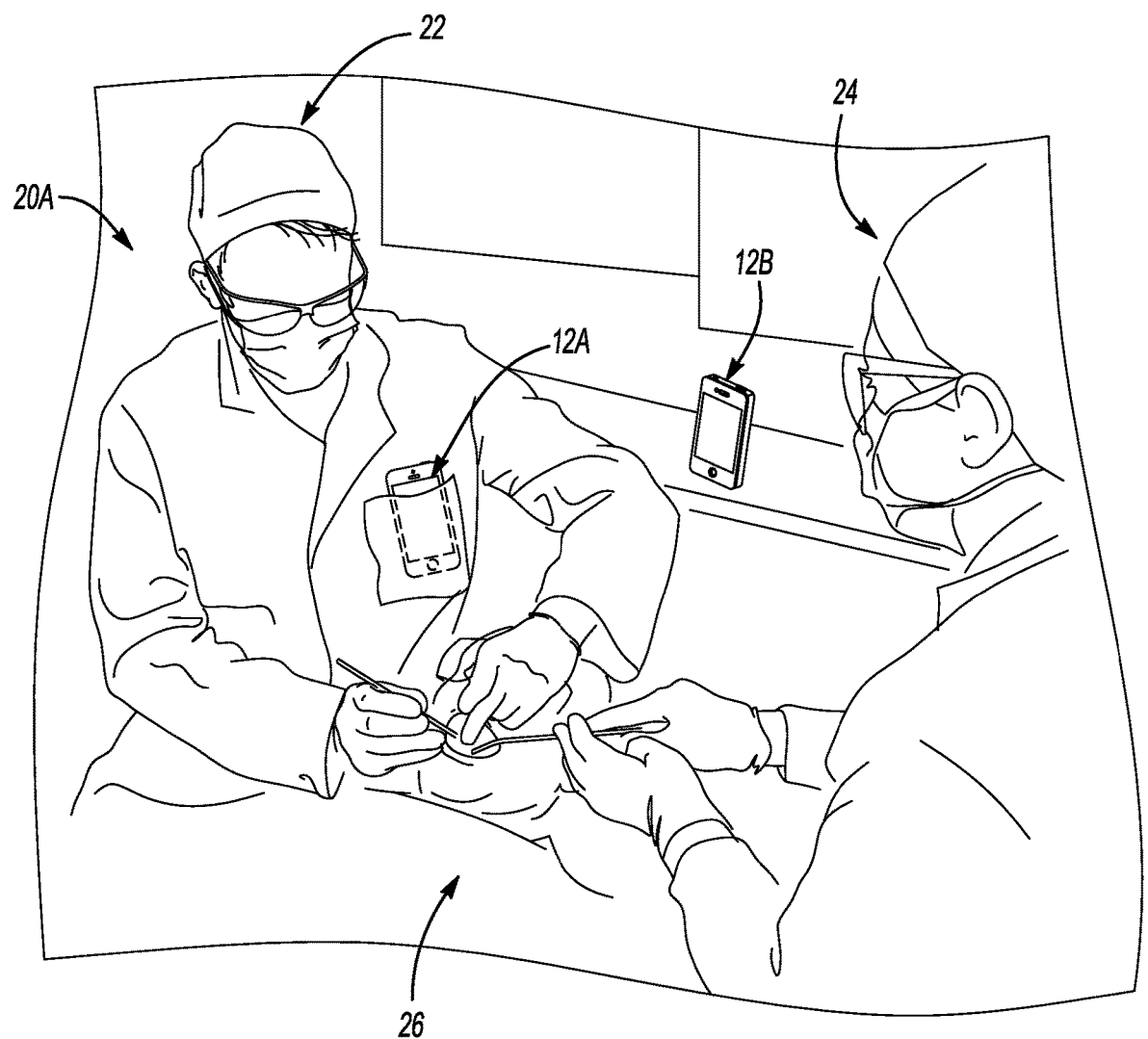
FIG. 3 is a view of a dentist performing a procedure on a patient with the assistance of a dental hygienist. Mobile devices of the dentist and the hygienist are visible in the drawing.

FIG. 3 illustrates a dentist 22 and a hygienist 24 performing a procedure on a patient 26 in exam room 20A. While performing the procedure, the dentist 22 and hygienist 24 generally do not have their hands available to use a smartphone. In this example, the dentist and hygienist 24 have been assigned mobile devices 12A and 12B, respectively. The mobile devices 12A, 12B are running the software application, even when the lock screen of the mobile devices 12A, 12B is active, such that the dentist 22 can operate mobile device 12A and the hygienist 24 can operate mobile device 12B using voice commands. The mobile devices 12A, 12B are in close proximity to the dentist 22 and hygienist 24, respectively, throughout a working day such that the dentist 22 and hygienist 24 can communicate with others in the dental office 18 using their respective mobile devices 12A, 12B. The mobile device 12A is in a pocket of the jacket of the dentist 22, while the mobile device 12B is resting on a nearby table. The mobile devices 12A, 12B could be used with wireless headsets in some examples.

The mobile devices 12A-12N, when running the software application, are configured to respond to verbal commands of a respective user. The mobile devices 12A-12N may be programmed to recognize a voice of a respective user, such that the mobile device 12A responds to the dentist 22 and not the hygienist, for example. The mobile devices 12A-12N may be programmed to respond to a verbal command including a wake word or phrase followed by a specific command or request. The wake word may be a name of the software application, such as "ENDWIRE." In that example, the wake phrase may be "Hey ENDWIRE." Various commands and requests that may follow the wake word or phrase will be described below. In addition to verbal commands, however, the mobile devices 12A-12N may be able to respond to traditional, typed or selected inputs which a user manually enters via a touchscreen interface of the mobile devices 12A-12N, for example.

In one aspect of this disclosure, the system 10 is used across a number of different offices. The different offices may be commonly owned, or associated with a common medical or dental practice. When a user logs into the software application, the software application may prompt a user to select their current location from a list of offices or medical/dental clinics, for example. When the user selects their current location, the software application then updates the contacts, groups, favorites, and/or other settings associated with the user when the user is at that particular location. Alternatively, the software application may be able to determine the location of the user automatically using the location services of the mobile devices 12A-12N, for example.

Users of the software application can update their current status, or the software application may update the status of a user automatically, such that other users of the software application can view that status. Example statuses are busy, away, available, online, offline, etc.

An aspect of this disclosure related to a task message will now be described. In this aspect of the disclosure, one of the mobile devices, such as mobile device 12B generates a task message which is then sent to a particular mobile device, such as mobile device 12A, or a group of mobile devices. The task message is a message including a request for the recipient to perform a task. The tasks may be predefined and saved on the mobile devices 12A-12N and/or central computing device 14. An example task is a request for a dentist to come into a particular one of the exam rooms 20A-20G and perform a step in a procedure, such as a post-cleaning examination of a patient. The task message may be created using verbal commands, such as "Hey ENDWIRE, request dentist to perform patient exam in room 1." The term "dentist" in the preceding phrase would be sent to a group of all dentists in a respective location. The term "dentist" can be replaced with a name of a particular dentist, such as "Dr. Smith," in which case the task message would be sent only to Dr. Smith.

The task message may be built by the mobile device 12A-12N by asking the user to provide various inputs. For instance, the user may say "Hey ENDWIRE, generate task message." The mobile device 12A-12N, may then respond "who is the recipient'?" The user can then respond with a recipient such as "Dr. Smith" or "all dentists" as examples. The mobile device may then respond with "what is the requested task'?" The user may then respond with one of a plurality of tasks, such as "exam" or "crown impression completion" or "x-ray review," etc. The mobile device may then respond with "what location'?" The user may then respond with the location corresponding to the task message, such as "exam room 1." The resultant task message may be "Dr. Smith, an exam is required in room 1," or "Exam required in room 1." While the task message may be audibly generated, the task message may alternatively be generated by providing manual inputs via a touchscreen interface of a respective mobile device 12A-12N, which may include drop-down menus through which the user may select a task from a list of predefined tasks, location, recipients, etc. When creating the task message either manually or audibly, the mobile device 12A-12N may attempt to guess what message the user may be attempting to generate based on the history of the user. For instance, if the user normally sends a high volume of exam requests to a particular dentist, the system may automatically populate that information or ask the user upfront whether they would like to repeat a previous task message from their history, for example. Further, a particular user may have a unique list of potential messages based on the role of that particular user. For instance, a hygienist may have a different list of potential messages than a dentist.

In the case where a task message is sent to a specific individual, the mobile device 12A-12N associated with the recipient is configured to repeatedly, and at predefined intervals, play the task message audibly until the recipient provides an input to their respective mobile device 12A-12N clearing the task message. In the case where the task message is sent to Dr. Smith, who uses mobile device 12A, the mobile device 12A will audibly play a task message such as, "Dr. Smith, an exam required in room 1" or "Exam required in room 1" or "Ready for exam in room 1." The task message may also indicate the sender of the message, such as "From Anne: Ready for exam in room 1." Until the task message is cleared, the message will repeat at predefined intervals on a continuous loop. For instance, the task message will play a first time, and if it is not cleared it will play again after a predefined interval has passed, such as 1 minute or 3 minutes as example, and it will play again every minute or 3 minutes, again as examples, until cleared. The task message can be cleared by providing a manual input via the respective mobile device 12A-12N or providing an audible command, such as "Hey ENDWIRE, clear the task message" or "Hey ENDWIRE, clear." By repeating the message until it is cleared, the recipient does not forget about the message, which could happen if the message was delivered only one time, especially in a dynamic setting such as a medical or dental office.

In an aspect of this disclosure, the task message will only begin repeating once the recipient has confirmed receipt of the message, either audibly or by manual input. In this way, if a task message goes unconfirmed for a period of time, such as 10 seconds, the sender will be notified and the sender can decide whether to attempt to send the message to another recipient, for example. If the recipient confirms the message, the sender will be notified.

In the case where a task message is sent to a group, such as all dentists in a particular location, the mobile devices 12A-12N associated with that group of recipients plays the task message audibly and asks the recipients of the group to confirm receipt of the task message. For instance, the task message may be "All dentists, an exam is required in exam room 1. Please confirm receipt." The message repeats at predefined intervals until a dentist confirms receipt. Once a particular dentist confirms receipt, such as by responding with "Hey ENDWIRE, confirm receipt," then the sender is notified and the confirming dentist essentially owns that task message. In other words, the task message is assigned to the particular dentist that confirmed receipt, and the task message repeats at predefined intervals, only on the mobile device associated with the dentist that confirmed receipt, until the confirming dentist clears the message.

The system 10 may be able to prioritize or hold task messages if a particular user or group receives a relatively high number of task messages in a relatively short period of time. Further, in addition to playing the task messages audibly, the mobile devices 12A-12N are configured to display the task messages such that the user can see all task messages including information about the task message, such as when it was sent, etc.

Another aspect of this disclosure relates to one-on-one calling. Each of the mobile devices 12A-12N is able to call each of the other mobile devices 12A-12N. A user is able to initiate a call using a verbal command, such as "Hey ENDWIRE, call Dr. Smith." The recipient knows they are receiving an incoming call because their mobile device 12A-12N will either ring or inform them of the incoming call by playing a message which states information about the origin of the call, such as "Incoming call from Anne." The recipient of a call is able to answer, decline, silence, or send an incoming call to voicemail using verbal commands, such as "Hey ENDWIRE, answer" or "Hey ENDWIRE, accept." If a user is on a one-on-one call when a task message is received by the user, an audible "ding" noise may play during the call. The task message will then be audibly played when the call is over. A call sender may cancel a call using a voice command. A call sender may receive a busy response if the recipient is already on another call, or an offline response if the recipient is offline.

When a one-on-one call is connected, the call sender and recipient can talk as normal. To end a call, one of the users can either hang up by pressing a button on a touchscreen of their mobile device, or by using a verbal command such as "Hey ENDWIRE, end call." When on a call, users on the other end of the call do not hear the command of the other user. Rather, the users on the other end of the call only hear the wake word. Using the above example, the user that is not ending the call will only hear "Hey ENDWIRE" and will not hear "end call." The mobile device 12A-12N of the user inputting a voice command does not transmit anything after the wake word when on a one-on-one or group call. Voice calls may end after a predefined time, such as 45 minutes, if a call is not ended beforehand. The calls may also auto-shut off using sound detection, such as if a volume is below a predefined threshold.

The mobile devices 12A-12N are also configured to initiate group calls. Group names can be preset, such as "all dentists" or "all hygienists," as examples. A user can initiate a group call by inputting a verbal command such as, "Hey ENDWIRE, call all dentists," or "Hey ENDWIRE, call Mary, Jack, Jason, and Maria." The mobile devices 12A-12N of the recipients of a group call may be informed of the group call by having their mobile devices 12A-12N play a message such as "Incoming group call from Dr. Smith including Mary, Jack, and Jason" or "Incoming group call from Mary to all dentists." Individual group call recipients can accept the group call using standard voice commands. The line may beep once as individuals join and leave the group call. The group call can be ended using a voice command such as "Hey ENDWIRE, end group call" or "Hey ENDWIRE, end call." A request to join a group call will time out for a particular recipient if that recipient does not accept the group call within a predefined time, such as 30 seconds.

The users of the mobile devices 12A-12N can set their status using audible commands and can check the status of other users using audible commands, such as "Hey ENDWIRE, check the status of Mary." If Mary's status is set to away, the mobile device will respond by playing a message that states "Mary is away." Other example statuses are available, offline, online, busy, etc.

The mobile devices 12A-12N are configured to display a reminder list to a user, which is specific to that user. The reminder list is a central list that includes all task messages and other general reminders that have been sent to a particular user, and which have yet to be cleared by the user. On the reminder list, the user can see whether a particular task message or reminder was intended for them specifically or for a group within which they are included. Newer reminders will be higher on the list. All reminders will be cleared at the end of a working day in some examples, and in other examples reminders are not cleared from day to day.

Each of the mobile devices 12A-12N is able to send a reminder to particular user or a group of users. The reminders may be played audibly when received. An example reminder is "Lunch is available in the break room." These reminders may be added to a reminder list of a user.

Another aspect of this disclosure relates to a task-specific timers. The mobile devices 12A-12N each include an interface configured to receive an audible request to set a timer for a predefined task. Each of the mobile devices 12A-12N is then configured to correlate the predefined task with a predefined period of time, and, in response to the audible request to set a timer for a predefined task, the mobile device is configured to set a timer for the predefined period of time corresponding to the respective predefined task. At the end of the predefined period of time, the mobile devices 12A-12N are configured to issue a message and/or alert to the user indicating the timer has expired. The message indicating the timer has expired may include a location of origin at which the timer was set. The user may set the location or the mobile devices 12A-12N may be configured to detect the location.

For example, if a dentist is performing a dental crown procedure in exam room 1, the dentist may set a timer for a crown impression by issuing the following audible command: "Hey ENDWIRE, set a crown impression timer." The mobile device 12A-12N of the dentist that set the timer would then determine, such as by communicating with the server, an appropriate timer length associated with a crown impression. In one example, the timer length is 5 minutes. The mobile device 12A-12N will also determine, such as using Bluetooth or other wireless network technology to determine where the dentist is when the timer is set. After the timer is expired, the mobile device 12A-12N of the dentist will issue a message audibly stating "Crown impression completed in exam room 1." The mobile device 12A-12N may then repeat the message at predefined intervals until it is cleared. The message could also be a sound effect, which may or may not correspond to a particular timer.

The mobile devices 12A-12N are also able to set non-task specific timers for defined periods of time, such as in response to a verbal command like "Hey ENDWIRE, set a timer for 3 minutes."

The mobile devices 12A-12N are also configured to send a broadcast to each of the other mobile devices. These broadcasts may be targeted at another individual user, a group of users, or an entire dental office, as an example.

The system 10, including the mobile devices 12A-12N and/or the central computing device 14, may include a mobile device management (MDM) software, or MDM server, or MDM client. When present, the MDM software restricts certain native functionality of the mobile devices 12A-12N that would otherwise be present and native to the mobile devices 12A-12N. In a particular example, the mobile devices 12A-12N are configured to only run the software application discussed above (i.e., the software application that enables intra-office communication). The mobile devices 12A-12N may be configured to permit users to access certain other functions of the mobile devices 12A-12N, such as selecting a wireless network or turning Bluetooth on or off. The MDM software, however, does not permit a user to run traditional applications native to the mobile devices 12A-12N, such as email, call, text, etc. (except, of course, as provided by the non-native software application), or to download additional applications. Effectively, the MDM software makes it such that the mobile devices 12A-12N are intended only for use in running the software application discussed above.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A system, comprising:
a first mobile device; and
a second mobile device, wherein the first mobile device is configured to send a task message to the second mobile device and, in response, the second mobile device is configured to repeatedly, and at predefined intervals, play the task message audibly until an input clearing the task message is received by the second mobile device,
wherein the system includes a group including the second mobile device and a plurality of additional mobile devices, and
wherein, in response to the first mobile device sending the task message, each of the mobile devices in the group is configured to repeatedly, and at predefined intervals, play the task message audibly until an input confirming receipt of the task message is received by one of the mobile devices in the group.

2. The system as recited in claim 1, wherein the task message is a message including a request for a user of the second mobile device to perform a task.

3. The system as recited in claim 2, wherein:
the task is one of a plurality of predefined tasks;
an interface of the first mobile device is configured to present the plurality of predefined tasks for selection by a user of the first mobile device, and
in response to the user of the first mobile device selecting one of the plurality of predefined tasks, the first mobile device is configured to generate the task message.

4. The system as recited in claim 3, wherein the first mobile device is configured such that the user of the first mobile device is able to select the one of the plurality of predefined tasks using one or more audible commands.

5. The system as recited in claim 1, wherein the second mobile device is configured to receive an audible input clearing the task message.

6. The system as recited in claim 1, wherein:
when one of the mobile devices in the group receives an input confirming receipt of the task message, the task message is repeatedly, and at predefined intervals, played audibly only on the mobile device that has received the input confirming receipt of the task message, until an input clearing the task message is received by the mobile device that has received the input confirming receipt of the task message.

7. The system as recited in claim 1, wherein:
the group further includes the first mobile device, and
the first and second mobile devices are configured to initiate and receive one-on-one calls with the other mobile devices in the group.

8. The system as recited in claim 7, wherein the first and second mobile devices are configured to initiate and receive group calls with the other mobile devices in the group.

9. The system as recited in claim 7, wherein the first and second mobile devices are both configured to send a broadcast to each of the other mobile devices in the group.

10. The system as recited in claim 1, wherein the first mobile device is configured to send a task message to the second mobile device when the first mobile device is in a lock screen.

11. The system as recited in claim 1, wherein use of at least some native functionality of the first and second mobile devices is restricted by a mobile device management software.

12. A system, comprising:
a first mobile device; and
a second mobile device, wherein the first mobile device is configured to send a task message to the second mobile device and, in response, the second mobile device is configured to repeatedly, and at predefined intervals, play the task message audibly until an input clearing the task message is received by the second mobile device,
wherein the first mobile device is configured to send a general reminder message to the second mobile device,
wherein the second mobile device is configured to audibly play the general reminder message, and
wherein the general reminder message includes information that is relevant to a user of the first mobile device but is not a task required to be performed by the user of the first mobile device.

13. A method, comprising:
sending a task message from a first mobile device to a second mobile device, wherein the task message is a message including a request for a user of the second mobile device to perform a task;
repeatedly, and at predefined intervals, playing the task message audibly on the second mobile device;
stopping the second mobile device from playing the task message when an input clearing the task message is received by the second mobile device;
sending the task message from the first mobile devices to a plurality of mobile devices in a group;
repeatedly, and at predefined intervals, playing the task message audibly on each of the mobile devices of the group; and
receiving a message from one of the mobile devices of the group confirming receipt of the task message;
stopping all mobile devices from playing the task message except the mobile device that confirmed receipt of the task message;
repeatedly, and at predefined intervals, playing the task message audibly only on the mobile device that confirmed receipt of the task message; and
stopping the mobile device that confirmed receipt of the task message from playing the task message when an input clearing the task message is received by the mobile device that confirmed receipt of the task message.

* * * * *